Figure 1:
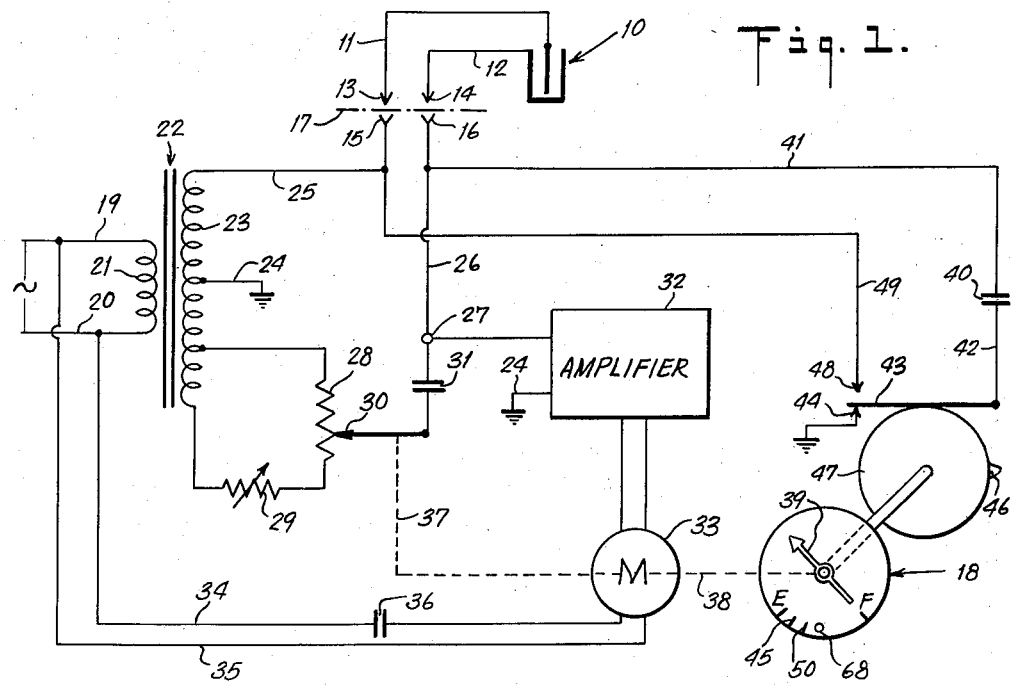

Aug. 12, 1958

A. WICKESSER 2,846,880

FUEL MEASURING SYSTEM FOR AIRCRAFT DROP TANKS

Filed March 29, 1956

INVENTOR.
ARTHUR WICKESSER
BY R. J. Dearborn
ATTORNEY

United States Patent Office 2,846,880
Patented Aug. 12, 1958

2,846,880

FUEL MEASURING SYSTEM FOR AIRCRAFT DROP TANKS

Arthur Wickesser, Westbury, N. Y., assignor to The Liquidometer Corporation, Long Island City, N. Y., a corporation of Delaware Application March 29, 1956, Serial No. 574,676

4 Claims. (Cl. 73—304)

The present invention relates to a fuel measuring system for aircraft drop tanks. More particularly it is desired, in accordance with the present invention, to provide suitable means for indicating the quantity of fuel in an airplane tank, wherein provision is made for dropping the tank from the airplane at the discretion of the pilot, for example, after the gas supply thereof has been exhausted. It is now quite usual, particularly in connection with military aircraft intended for flying long distances from a base to a point where their mission is to be carried out, to provide one or more extra tanks of fuel, which can be dropped at the discretion of the operating personnel either when empty or otherwise. Once these tanks have been dropped, the airplane is consequently lightened in its normal weight and thus is, to a certain extent at least, more maneuverable and requires less fuel for a given distance or time of flight than when operating with a heavier load. With the conventional fuel indication systems, as have been developed to date, it is usual that some impedance means be carried with each of the tanks and be responsive to the amount of fuel in the tanks as to the impedance value of such impedance means. If the tank is dropped, the impedance means which is carried by the tank remains with the tank and is thus abruptly disconnected from the circuit or electrical system in which the impedance means is normally connected for measuring and indication purposes. If no particular means were provided in the associated measuring and indication system, the measuring means, for example a pointer operating in connection with a dial, would in many instances at least and with many known systems, be moved not only to and beyond one normal limit of its ordinary amplitude of movement, but might tend to move continuously in that same direction, resulting possibly in damage to the indicating instrument. Obviously this is undesirable, so that the art has provided means to avoid such a contingency. The means heretofore provided have comprised, for example, the provision of a spare or substitute impedance means having an impedance value similar to that of the impedance means carried by the tank and which was disconnected from the system by the dropping of the tank. In order to connect in the substitute impedance means, relay means have been proposed, and in fact used, which are energized (or deenergized as the case may be) upon the dropping of the tank and which serve to connect into the system the substitute impedance means.

For example, in many modern fuel quantity indication systems, the impedance means in the tank comprises an electric capacitor, which is so arranged in the tank as to extend between the levels of the fuel to be indicated and with provision for the fuel to enter freely into the space between the capacitor electrodes. Due to the fact that the dielectric constant of most fuels is about twice that of air, the capacitance change of such a capacitor is a function of the amount of fuel in the tank. This is true whether the actual indication means employed be calibrated in terms of volume or of weight (both types of calibration being used in different systems at the present time). In such systems a substitute capacitor having a capacitance value similar to that of the regular measuring capacitor for the tank when the tank is empty is used in such manner as to be connected into the circuit by some relay means upon the dropping of the tank with its built-in capacitor.

It has been found, however, that the relay systems hereinabove referred to for connecting in the substitute impedance have not been wholly satisfactory in their operation; and, in addition, the weight of the component parts of such a relay system has resulted in an undesired increase in the weight of the measuring system as a whole. The present system also saves considerable wiring, which was required for the older relay system, and further saves in power which was formerly required for relay operation.

The present invention seeks to avoid both objections to the prior systems in that it eliminates the relay heretofore found to be necessary and substitutes in lieu thereof a simple switch means, which is more certain in its operation and which is smaller in weight than the relay systems hitherto used. In accordance with the present invention, the switch means is actuated in response to the indicator, be it a pointer type indicator or a counter type, moving beyond one of its normal limiting positions or settings by some predetermined amount. When this occurs, due to the tank being measured having been dropped from the aircraft, and the system operating so as to move the pointer or counter, as the case may be, beyond one of its normal limits of movement, then the switch means is automatically actuated to connect into the circuit a substitute impedance means having an impedance value such that the system will come to rest with the indicator thereof at a predetermined off-scale position. In the case of a counter type indicator, the system will bring this counter to some predetermined value which can be recognized as indicative of the condition established by the dropping of the tank.

In some systems to which the present invention is applicable, there is also employed a compensating capacitor which is normally wholly immersed in the liquid in the tank being measured, so that its capacitance varies solely as a function of the dielectric constant of such liquid. In practically all instances, such compensating capacitors are energized by a variable potential such that the potential transmitted therethrough when the tank is substantially empty is at a minimum value; while such potential, when the tank is substantially filled, is at a maximum value. In view of this arrangement, it has been found that even though such capacitors are separated from the system simultaneously with the separation of the measuring capacitor as aforesaid, the fact that the potential therethrough is at a minimum when the tank is empty makes for a minimum of change in the indicator or counter position.

Figure 2:
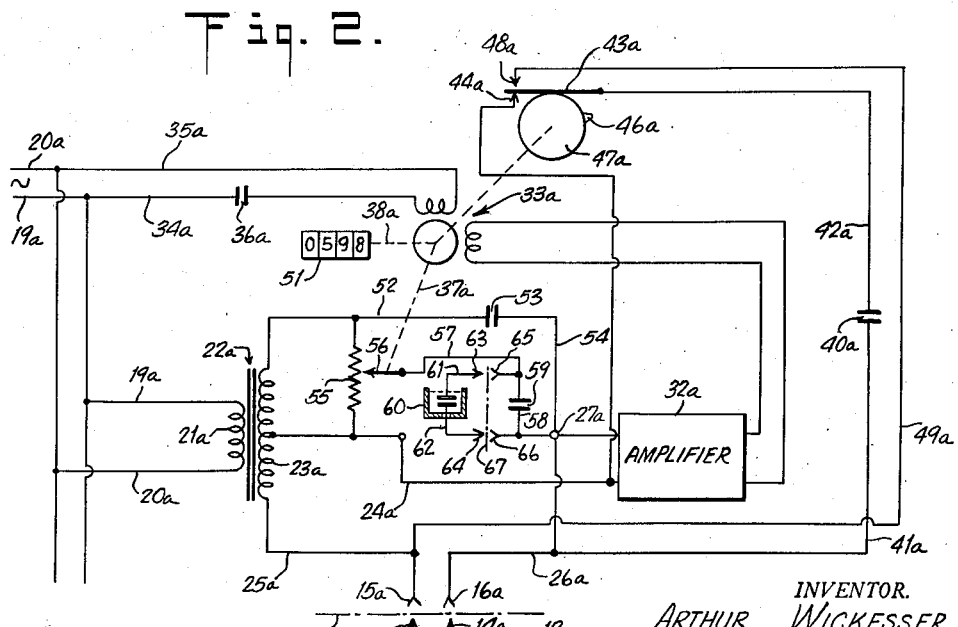

Other and more detailed features of the invention will become apparent from a consideration of a detailed description of two embodiments of the invention which follow. These embodiments will be described in connection with the accompanying drawings, in which:

Figure 1 is a diagrammatic showing of a simple fluid quantity indicating system with which the present invention is associated, the showing being primarily a wiring diagram; and Fig. 2 is a similar showing of a more modern type system including a compensating capacitor built into and adapted normally to be immersed in the liquid in the tank and which is also separated from the remainder of the system by the act of dropping the tank. The system of Fig. 2 is one which is capable of being quite accurately calibrated in units of weight, so as to indicate the quantity of fuel in the tank in such units.

Turning now to Fig. 1 of the accompanying drawings, there is illustrated in this figure a system for indicating the quantity of liquid in a tank of a type which has been known for some time. This system includes a measuring capacitor 10, which is shown as one example of an impedance, the impedance value of which varies with the amount of liquid in the tank to be measured. In this instance the liquid to be measured is permitted to flow freely to and from the space between the plates of the capacitor 10, and the capacitor extends more or less vertically through the liquid, so that its capacitance has a value which is a function of the amount of liquid in the tank. The capacitor 10 is connected by conductors 11 and 12 to contact terminals 13 and 14 respectively. These contact terminals are arranged normally to engage and make electrical contacts with contact terminals 15 and 16 respectively, but may be separated therefrom when the tank is dropped as indicated by the broken line 17.

While the measuring impedance is here shown as a capacitor 10, it could as well be some other form of impedance, provided, however, that the impedance value is suitably arranged to be a function of the amount of liquid in the tank to be measured.

In the present instance the impedance element or capacitor 10 in this case, is connected into an electrical circuit system for translating the impedance value sensed by the capacitor 10 into a measure of the amount of liquid in the tank, which measure can be indicated by a suitable indicator here shown generally at 18. There is illustrated in Fig. 1 a simple electrical system for this purpose, this system being energized from a suitable source of alternating current comprising, for example, the power leads 19 and 20, which are suitably connected to a source of A. C. potential such as may be available in the aircraft in question. The leads 19 and 20 are connected to the primary winding 21 of a transformer 22, the secondary winding 23 of which serves to provide desired sources of potential for a bridge circuit. As shown, a center portion of the secondary winding 23 is grounded at 24. The upper end of the winding 23, as shown, is connected by a conductor 25 to terminal 15 and thence to one plate of the capacitor 10. The other plate of the capacitor 10 is connected through conductor 12, terminals 14 and 16 and a conductor 26 to a circuit output point 27.

A portion of the secondary winding 23 is also connected across a series-connected potentiometer resistance 28 and a variable resistance 29. A variable tap 30 working on potentiometer resistance 28 is connected through a balancing condenser 31 to the circuit output point 27. The other circuit output point is ground, shown at 24, so that the two circuit output points 24 and 27 may be used as the input connections for an amplifier 32 of any conventional type, which is arranged to control the operation of a servo-motor 33, this motor preferably being of the split phase type having one coil energized from the amplifier 32 and a second coil energized through leads 34 and 35, in one of which is interposed a phase changing capacitor 36. Such servo-motors are now in common use in systems of this kind. The motor 33 is connected through a mechanical train indicated by the broken line 37 to the potentiometer tap 30, so as to move this tap to a position at which the bridge is balanced, resulting in a null or zero output current from the bridge at the circuit output points 24 and 27. It will be understood that the motor 33 is operated in such a direction and to such an extent as to balance the circuit to a zero or negligible output such that the motor will be brought to a stop when this condition is reached. The motor 33 is also mechanically connected by a mechanical train represented by the broken line 38 to the indicator 18 and serves to move the indicator to a position indicative of the position of the potentiometer tap 30 when the circuit is balanced. In such a system the variable resistance 29 is provided for calibration purposes.

If the system were arranged merely as described in detail thus far, the pointer 39 of the indicator 18 would tend to rotate substantially continuously in a counter-clockwise direction as shown, upon the dropping of the capacitor 10 with the associated tank.

With other types of impedance means, the pointer would tend to move beyond one of its normal terminal positions indicated as "E" standing for "empty," as one terminal position, and "F" standing for "full," as the other terminal position in the case of the indicator 18 shown. The particular connections of a given circuit and the particular type of impedance means used therein would dictate toward which end the pointer would move upon the physical separation of the measuring impedance incident to the dropping of the associated tank.

In the present instance it is desired that there be introduced into the system at the same place where the capacitor 10 is normally connected, a substitute or spare capacitor here indicated at 40. As shown, one plate of this capacitor is connected by a conductor 41 to the conductor 26 and terminal 16; while the other plate of the capacitor 40 is connected by a conductor 42 to a movable switch member 43 of a switch means which is arranged to be actuated mechanically upon the indicator 18 moving a predetermined distance beyond one of its terminal positions indicated at "E" and "F." In the present instance the switch means is shown as a single pole, double throw switch wherein the conductor 42 and movable member 43 are normally connected to a switch contact point 44 which is grounded as shown. When the pointer 39 moves beyond the normal empty boundary position "E" to a position as 45 a predetermined distance beyond this normal boundary position, then a lug 46 of a cam member 47, which is arranged to be moved in synchronism with the pointer 39 by the motor 33, operates to shift the movable switch member 43 so that it will now make contact with a contact member 48 of the double throw switch means and thus connect the conductor 42 through another conductor 49 to the conductor 25 and terminal 15. In this way the capacitor 40 is in effect connected electrically in the place of the capacitor 10 in the system previously described.

The capacitor 40 is preferably a fixed capacitor of some suitable type and has a capacitance value in this instance such as to cause the normal operation of the system to move the pointer 39 to a predetermined off-scale position, such for example as the point 50 of the indicator 18. It will be understood that in the event that some other type of impedance were used in lieu of the capacitor 10 shown, the impedance 40 would be a similar type of impedance and have a value such as to bring the indicator of the system to rest at a predetermined off-scale position which would indicate to the users of the system that the associated tank had been dropped.

Turning now to the form of the invention shown in Fig. 2, there is illustrated a circuit in which certain of the component elements are substantially the same as those in Fig. 1 and have the same or substantially similar functions. In such instances they will be given the same reference characters respectively with the letter $a$ attached to indicate that they apply to Fig. 2, rather than to Fig. 1.

As shown in Fig. 2, there is provided a measuring capacitor 10$a$, which may be the same as the capacitor 10 of Fig. 1. This capacitor is connected by conductors 11$a$ and 12$a$ to terminals 13$a$ and 14$a$ respectively. These terminals are adapted to be connected to terminals 15$a$ and 16$a$ respectively during the ordinary operation of the system, but may be disconnected therefrom upon the dropping of the tank in which the capacitor 10$a$ is built as indicated by the broken line 17$a$.

In this instance, instead of having an indicator 18 with a pointer as shown at 39, there is illustrated a counter type indicator 51 which has the functions of the indicator 18. In this case there is also provided power leads 19a and 20a which are supplied with A. C. current from a suitable source and which are connected to energize the primary winding 21a of a transformer 22a which has a secondary winding 23a. A point centrally of the secondary winding 23a may be considered as a base potential for the system and/or may be grounded as indicated at 24, Fig. 1. The actual grounding in this instance is optional as the system is equally operative with or without such actual grounding and with the circuit as shown in Fig. 2 of the drawing. In this embodiment of the invention, this point is shown connected by a conductor 24a directly to one input terminal of the amplifier 32a. One end of the secondary winding 23a may be connected by a conductor 25a to the terminal 15a and thence through terminal 13a and conductor 11a to one plate of the capacitor 10a. The other plate of the capacitor 10a may be connected through conductor 12a and terminals 14a and 16a and thence through a conductor 26a to a circuit output point 27a, which is similarly connected to one of the input terminals of the amplifier 32a.

The other end of the secondary winding 23a is shown connected through a conductor 52 to one terminal of a fixed capacitor 53, the other terminal of which is connected by a conductor 54 to the circuit output point 27a.

It has been found desirable to have the capacitance of the capacitor 53 substantially equal to the capacitance of the capacitor 10a when it is in an empty tank, i. e. when the space between its plates is empty of the liquid being measured. As such, the capacitor 53 has sometimes been termed an "empty tank compensation capacitor," in that there is supplied therethrough to the circuit output point 27a, a current which is substantially equal in amount and opposite in phase to the current supplied to this circuit output point through the capacitor 10a when the latter is located in an empty tank.

There is also provided in this embodiment of the invention a compensation network including a potentiometer resistance 55 connected between the conductors 24a and 52 and provided with an adjustable tap 56, which serves by its adjustment to balance the circuit to a condition of zero or null output or, in other words, a zero input to the amplifier 32a. The tap 56 is connected through conductors 57 and 58 and a fixed capacitor 59 to the circuit output point 27a. There is also provided, and normally connected in parallel with the capacitor 59, a submerged compensating capacitor 60, which is preferably permanently located in the bottom of the tank, the contents of which are being measured, and is arranged so that the liquid in the tank exists between its plates at all times. Thus the capacitance of the capacitor 60 is varied solely as a function of the dielectric constant of the liquid. As shown, the plates of the capacitor 60 are connected by conductors 61 and 62 to terminals 63 and 64 respectively. These terminals are normally connected to terminals 65 and 66 respectively when the system is in its normal operation in measuring the contents of an associated tank. When, however, the tank is dropped from the aircraft, the terminals 63—65 and 64—66 are separated as indicated by a broken line 67.

The amplifier 32a is connected as diagrammatically illustrated in Fig. 2 to control the operation of a servomotor 33a by controlling the direction and amount of current flowing through one of the coils of this motor, the other coil being energized through conductors 34a and 35a in one of which is interposed a phase changing capacitor 36a as previously described. Also, as previously described, the motor 33a is mechanically connected by a mechanical train illustrated by the broken line 37a to the tap 56 on the potentiometer resistance 55, the motor thus serving to rebalance the circuit to a condition of substantially zero output. The motor 33a is further connected by a mechanical train indicated diagrammatically by a broken line 38a to the counter 51, so that the counter will show a value indicative of the position of the tap 56 on the potentiometer resistance 55.

The circuit just described in Fig. 2 in its normal operation is substantially identical with that disclosed in the Sontheimer et al. application Serial No. 177,574, filed August 4, 1950, which is owned in common with the present application. As specifically taught in this Sontheimer et al. application, when the values and particularly the relative values of the several circuit components and of the several voltages applied through these components are appropriate, the indicator 51 may be graduated in terms of liquid weight, rather than liquid volume without undue inaccuracies. This takes advantage of a fortuitous empirical relationship which has been found to exist between the dielectric constant of many liquid fuels which are usable in aircraft propulsion and the densities of those fuels. It has been found that within the range of most normal operation, and with most fuels, a circuit as shown and with appropriate values or relative values such as are particularly taught in the Sontheimer et al. application, will afford an indication in terms of weight units with a minimum inaccuracy throughout a working range, the actual error being well within tolerable limits. This, however, forms no part of the present invention, which is directed as aforesaid to the provision of special means for preventing undesired operation of the system upon the dropping of a tank with which the system has been used.

In this connection the provision preferably made is substantially similar to that in Fig. 1, in that there is provided a capacitor 40a connected by a conductor 41a to the conductor 26a and terminal 16a, and having its other plate connected by a conductor 42a to the movable member 43a of a switch means, which is similarly operated to the corresponding numbered member in Fig. 1. The only difference in this case is that the cam member 47a having the lug 46a for operating the switch to throw it from its contact 44a to the contact 48a, may be driven either directly from the motor 33a or from any part of the mechanical train or trains which are driven by this motor, so as to be operable in synchronism with the counter 51. The contact 44 may be connected to the conductor 24a, which is at the base potential for the circuit of this form of the invention.

In the same way the switch means is adapted to throw the capacitor 40a into the circuit in the place of the capacitor 10a after the latter has been separated from the circuit by the dropping of the tank in which it is built and after the counter 51 (in this instance) has been moved to some predetermined position, which will be in effect off-scale and which corresponds in its numerical value, for example, to the position 45 of the needle 39 on Fig. 1 of the drawing. It will be understood that cam disc 47a may in fact comprise any movable element which may form a part of, or be driven by, any mechanical train driven by the motor 33a and arranged so as to operate the switch means in a manner equivalent to that shown and as described in connection with Fig. 1.

The only further difference between Figs. 1 and 2 is that in the Fig. 2 form, not only is the capacitor 10a separated from the remainder of the circuit upon the dropping of the tank, but also in this instance the capacitor 60 is similarly separated from the remainder of the system when the tank is dropped. In this instance, however, the current flowing through the capacitor 60 is minimized when the tank is empty, as the tap 56 is then located adjacent to the lower end, as seen in the drawings, of the potentiometer resistance 55. Conversely, when the tank is filled, the tap 56 will be brought up to the upper end (as shown) of the resistance 55, so that the potential supplied to the capacitor 60 will then be at a maximum value. Inasmuch, therefore, as the normal operation of the circuit upon the dropping of the tank (which is ordinarily dropped when the tank is empty) will result in the capacitance between the terminals 15a and 16a dropping substantially to zero (whether or not the dropped tank was empty), which will result in the motor 33a moving the counter or indicator toward and/or past its zero point, and also moving the tap 56 to the lower end of its path of movement as shown in the drawings, there will be a minimum potential available on the conductor 57 (when or shortly after the tank is dropped) and hence the dropping of the capacitor 60 will have little or no effect upon the potential supplied to the input of the amplifier 32a. In other words, the circuit will operate substantially the same for both the forms of Fig. 1 or Fig. 2.

It is found, for example, that in many, if not all, systems embodying submerged compensating condensers, equivalent in their general operation to that of the condenser 60, the dropping of such a condenser will not substantially affect the operation of the system wherein there is provided a substitute condenser, the system reaching a point of balance with the indicator or counter at a predetermined off-scale position or reading.

It is further noted that, if desired, and when an indicator as shown in Fig. 1 is used, including a pointer as shown at 39, there may be provided a conventional mechanical stop means indicated diagrammatically at 68 for providing an ultimate and positive limit for pointer movement.

While there is herein shown and described but two different embodiments of measuring systems to which the present invention is applicable, the application of this invention to other types of liquid contents measuring systems will be obvious to those skilled in the art from the foregoing particular teachings. I do not wish to be limited, therefore, except by the scope of the appended claims, which are to be construed validly as broadly as the state of the prior art permits.

I claim:

1. A liquid fuel quantity measuring and indication system for an aircraft fuel tank, wherein provision is made for dropping the tank from the aircraft while said system is in operation, said system comprising a measuring impedance carried by said tank and having an impedance value which is a function of the quantity of liquid fuel in said tank, and wherein said measuring impedance is separated from the remainder of said system when said tank is dropped from the aircraft in which said system is carried, a balanceable electrical network in which said measuring impedance is normally connected and which has a null electrical output when said network is in balance, a servomotor electrically connected to said network so as to be controlled in its operation by said electrical output of said network and mechanically connected to a variable electrical component of said network so as to balance said network and thereby to reduce the electrical output thereof substantially to zero, an indicating means mechanically driven by said motor and having a normal range of movement between predetermined boundary positions indicative of maximum and minimum tank contents respectively, said network being so constructed and arranged that upon the dropping of said tank and consequent disconnection of said measuring impedance from said network, said motor will move said indicating means beyond one of said predetermined positions defining its normal range of movement; a fixed impedance adapted to be electrically connected into said network in the place of said measuring impedance and having an impedance value such that when it is so connected into said network, the normal operation of said network will move said indicating means to indicate a predetermined value outside of the limits of said normal range, and switch means mechanically responsive to said indicating means moving a predetermined distance past one of the predetermined boundaries of said normal range for electrically connecting said fixed impedance into said network in the place of said measuring impedance.

2. A liquid fuel quantity measuring and indication system in accordance with claim 1, in which said measuring impedance and said fixed impedance are reactance means respectively.

3. A liquid fuel quantity measuring and indication system for an aircraft fuel tank, wherein provision is made for dropping the tank from the aircraft while said system is in operation, said system comprising a measuring capacitor carried by said tank and extending through the liquid therein so that the liquid enters between the plates making up said capacitor to an extent dependent upon the amount of liquid in the tank, the capacitance of said measuring capacitor being a function of the quantity of liquid fuel in said tank, and wherein said measuring capacitor is separated from the remainder of said system when said tank is dropped from the aircraft in which said system is carried, a balanceable electrical network in which said measuring capacitor is normally connected and which has a null electrical output when said network is in balance, a servomotor electrically connected to said network so as to be controlled in its operation by said electrical output of said network and mechanically connected to a variable electrical component of said network so as to balance said network and thereby to reduce the electrical output thereof substantially to zero, an indicating means mechanically driven by said motor and having a normal range of movement between predetermined boundary positions indicative of maximum and minimum tank contents respectively, said network being so constructed and arranged that upon the dropping of said tank and consequent disconnection of said measuring capacitor from said network, said motor will move said indicating means beyond the predetermined position defining the minimum terminal of its normal range of movement; a fixed capacitor adapted to be electrically connected into said network in the place of said measuring capacitor and having a capacitance value such that when it is so connected into said network, the normal operation of said network will move said indicating means to indicate a value a predetermined distance below the position thereof indicative of the minimum limit of said normal range, and switch means mechanically responsive to said indicating means moving a predetermined distance past its minimum limit of said normal range for electrically connecting said fixed capacitor into said network in the place of said measuring capacitor.

4. A liquid fuel quantity measuring and indication system in accordance with claim 3, comprising in addition, a capacitor normally disposed in said tank so that the plates thereof are always completely immersed in a part of the liquid fuel in said tank, so that its capacitance varies solely with the dielectric constant of said liquid fuel, this submerged capacitor also being separated from the remainder of said system upon the dropping of the tank from the aircraft in which said system is carried; and in which said system is provided with a variable voltage supply means electrically connected to said submerged capacitor and so arranged that when said tank contains a minimum of liquid fuel, the voltage supplied through said submerged capacitor is at a minimum value, while when said tank contains a maximum amount of liquid fuel, the voltage supplied through said submerged capacitor is at maximum value, whereby when said tank is dropped from the aircraft and said measuring capacitor and said submerged capacitor are thereby separated from the remainder of said system, the separation of said submerged capacitor will have a minimum effect on the position of said indicating means, so that upon the connection of said fixed capacitor into said network in the place of said measuring capacitor, said indicating means will be moved to and will remain at a predetermined off-scale position.

References Cited in the file of this patent
UNITED STATES PATENTS 2,563,280    Schafer _____ Aug. 7, 1951
2,563,281    Griffith _____ Aug. 7, 1951